June 22, 1954

W. S. WEST 2,681,712

LIFT-TRUCK

Filed Oct. 14, 1952

INVENTOR.
WILLIAM S. WEST
BY

INVENTOR.
WILLIAM S. WEST

Patented June 22, 1954

2,681,712

UNITED STATES PATENT OFFICE 2,681,712

LIFT-TRUCK

William S. West, Cleveland, Ohio, assignor, by mesne assignments, to The West Brick Buggy Company, a corporation of Ohio Application October 14, 1952, Serial No. 314,599

9 Claims. (Cl. 187—9)

My invention relates to lift-trucks used for transporting a load of material.

An object of my invention is to provide an improved lift-truck for use in the building construction industry and elsewhere where the use of such a lift-truck may be found appropriate and convenient.

Another object is the provision of an improved construction in a lift-truck adapted to the limitations and environment of a platform on a scaffold adjacent a building being constructed.

Another object is the provision of a lift-truck arranged to move forwardly relative to a load on a pallet, to embrace the load on the pallet between the sides of the truck, and to raise the palletized load for transportation of the palletized load by the truck.

Another object is the provision of an improved lift-truck in which the load is carried over the axis of the forward wheels of the truck, and arranged for better distribution of weight on the truck for facile movement of the truck on its wheels.

Still another object is the provision of a unique combination and ingenious arrangement of a wheeled truck and lifting device.

Other objects and a fuller understanding of the invention may be had by referring to the following description and claims, taken in conjunction with the accompanying drawings, in which:

Figure 1:
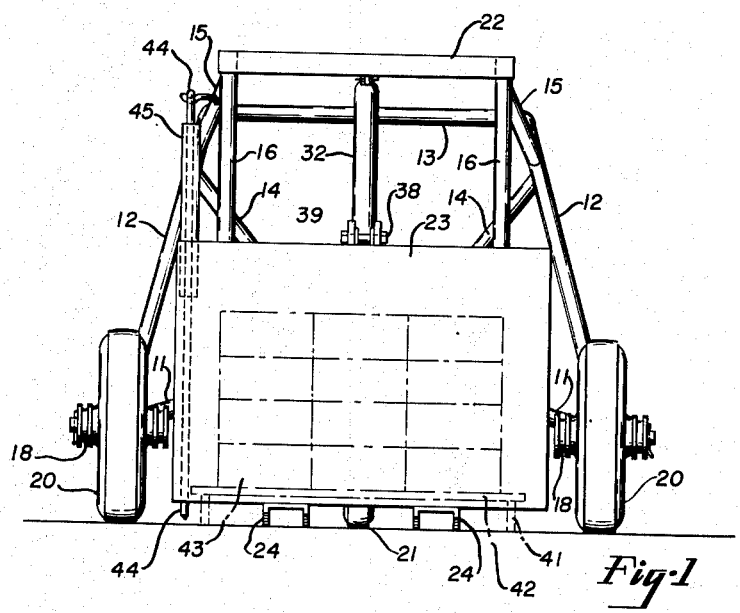
Figure 1 is a front view of my lift-truck showing the lifting device in the lowered position.

My truck includes a frame constructed of tubular members and structural pieces arranged and joined in a skeleton providing maximum strength and unique form appropriate for its use. Referring to the figures of the drawing, the frame has disposed along its lower portion two bottom frame members 11. The frame members 11 are in substantially triangular form and extend forwardly and outwardly from the rear portion of the truck and are on opposite sides of an open space or bay at the forward portion of the truck. A pair of diagonal frame members 12 are welded to the lower frame members, respectively, adjacent their forward ends and extend rearwardly and upwardly therefrom. The rearward ends of the diagonal frame members are integrally joined by a handle member 13. This handle member 13 disposed horizontally across the rear of the truck is arranged for manual pulling, pushing and turning of the truck. There are two bracing members 14 welded to the lower members 11 adjacent their rearward end near the apex of the triangular form of the lower members 11 and the bracing members 14 extend upwardly and outwardly where they are welded to the diagonal frame members 12, respectively, as shown in the drawings.

Figure 2:
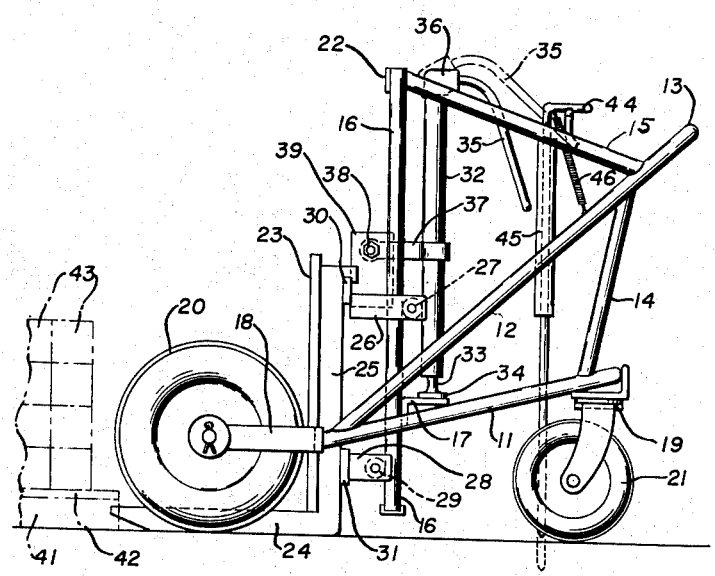
Figure 2 is a side view of my lift-truck with the lifting device in its lowered position.
Figure 3:
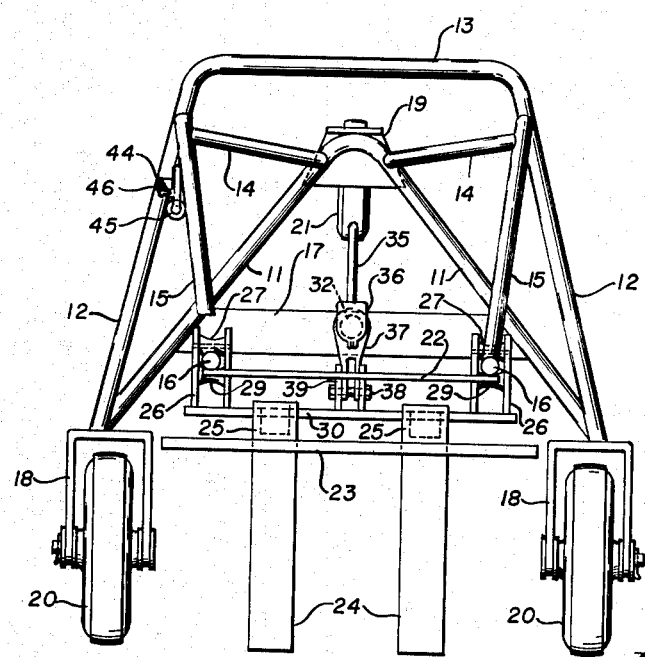
Figure 3 is a plan view looking down upon the lift-truck shown in Figure 1.

A pair of upper frame members 15 welded to the diagonal members 12, respectively, adjacent their rearward end extend forwardly and upwardly, as shown in the drawing. A pair of upright posts 16 are joined by welding to the forward ends of the respective upper members 15 and extend substantially vertically and downwardly therefrom. A top cross-brace 22 is joined by welding to the top ends of the upright posts 16 and the forward ends of the upper members 15 to add rigidity and strength to the frame. A lower cross-brace 17 is joined by welding to the lower frame members 11 and extends therebetween. The cross-brace 17 is an angle piece having a flat portion disposed uppermost, as seen in Figure 2. The lower end of the upright posts 16 extends downwardly to below the lower members 11, as shown in the drawings. The upright posts 16 are joined by welding to the lower cross-brace 17 and thus the upright posts 16 are held in substantially vertical position by the joinder of the posts to the upper frame members 15 and cross-brace 22 and to the forward face or portion of the lower cross-brace 17.

Joined by welding to the forward ends of the lower members 11 of the frame are a pair of forked wheel-mounting members 18. The mounting members 18 are disposed substantially horizontally and extend forwardly of the truck. Each mounting member 18 has parallel spaced portions to accommodate a wheel therebetween. A pair of front wheels 20 are journaled on the wheel mountings 18, respectively, the wheels 20 being on a common axis disposed transversely of the truck. Each wheel 20 rotates upon a shaft carried by a respective mounting member 18. The mounting members 18 and wheels 20 are spaced apart and are disposed on opposite sides of an open space or bay at the forward portion of the truck.

A swivel type wheel mounting 19 is joined by welding to the rear joined ends of the lower frame members 11. A rear wheel 21 is journaled upon the swivel mounting 19. The rear wheel 21 supports the rear end of the truck and by the swivel action of the mounting 19, the wheel 21 may be directed as desired for the purpose of turning the truck. The weight of the truck is carried by the three wheels 20, 20 and 21. The forward wheels 20, together with the forward portion of the frame, are so arranged that there is a bay or wide opening disposed at the forward portion of the truck. This bay or open front end is adapted to accommodate a load to be conveyed by the truck.

A lifting device is carried by the truck and is located in the open bay of the truck so as to provide for the raising and lowering of a load accommodated in this open bay. The lifting device has a fork or pair of fingers 24 disposed substantially horizontally. The fork 24 is adapted to extend under a palletized load and to support the palletized load upon the raising of the lifting device. The fingers or fork 24 extend upwardly to provide the upright portions 25, the portions 24 and 25 being integrally joined and at substantially right angles to each other. A backboard or plate 23 is secured to the forward face of the upright members 25 and this backboard 23 prevents any of the load from falling rearwardly, that is, inwardly, of the truck.

The lifting device is mounted to the upright posts 16 in a manner to permit the lifting device to be raised and lowered along the upright posts 16. There is an upper cross-bar 30 joined by welding to the upright portions 25 and extending therebetween. There is a lower cross-bar 31 joined by welding to the upright portions 25 of the lifting device and extending between the upright portions 25. The upper and lower cross-bars 30 and 31 impart strength and rigidity to the lifting device.

A pair of upper guide members 26 are joined by welding to the upper cross-bar 30 and extend rearwardly to embrace the respective upright posts 16. Journaled upon and extending between the parallel straps forming each upper guide member 26 is a roller 27. Each roller 27 carried by a guide member 26 is adapted to roll along the rearward face of a respective upright post 16. As the posts 16 are cylindrical in form, each roller 27 has an arcuate face complementing the outer surface of the upright post 16.

A pair of lower guide members 28 similarly made of a pair of spaced parallel straps are joined by welding to the lower cross-bar 31 of the lifting device. A roller 29 is journaled to each of the lower guide members 28 and extends therebetween to engage the forward cylindrical surface of the respective upright posts 16. It is noted that the upper rollers 27 are disposed on the rearward side of the upright posts 16, whereas the lower rollers 29 are disposed on the forward face of the upright posts 16. This is because the weight of a load on the fork 24 tends to pull the upper rollers 27 forwardly of the truck and to push the lower roller 29 rearwardly of the truck. To provide for facile and ready movement of the lifting device up and down along the posts 16, the bearing engagement is through the rollers 27 and 29.

In the embodiment shown, the raising means for raising and lowering the lifting device relative to the truck frame is a hydraulic jack. A mechanical jack or other mechanical-advantage means may be readily substituted and used for operating the lifting device or, if desired, a suitable motor could be incorporated for this operation. However, in most instances, a manually operated raising and lowering device, such as that illustrated, is most appropriate and convenient.

In the raising device illustrated, there is a hydraulic jack cylinder 32 positioned just to the rear of the upright posts 16 and approximately intermediate thereof, as shown in the drawings. A piston stem 33 joined to the piston within the cylinder extends downwardly from the jack, and a foot or base 34 of the piston stem 33 is secured by welding, bolts or other suitable means to the lower cross-brace 17 intermediate of its ends. Joined to the head 36 of the jack at its upper end is a handle 35. By a raising and lowering or pumping action of the handle 35, the hydraulic cylinder is operated. By throwing the operating valve of the jack in one direction and pumping the handle 35, the cylinder and piston move apart to raise the cylinder. By throwing the operating valve of the jack in an opposite direction the fluid circuit is reversed and the weight of the load on the jack brings the cylinder downwardly toward the piston base 34.

A connection 37 joined by welding or other suitable means to the jack cylinder 32 is connected by a bolt 38 to a bracket 39, the bracket 39 being joined by welding or other suitable means to the upper cross-bar 30 of the lifting device. Thus, upward and downward movement of the cylinder of the jack causes similar upward and downward movement of the lifting device. As the jack is operated to a raised position, the connection 37 raises the lifting device along the guided path provided by the upright posts 16.

For purposes of illustration, I show a load 43 of bricks or the like piled upon a pallet. As is well known, the pallet consists of a platform 42 secured to and resting upon long blocks or uprights 41. Other constructions of pallets or of skids or other arrangements for blocking up a load may be utilized. The arrangement of the load and its support is to be such that there is room under the load for the fingers or fork 24 when the lifting device is moved forwardly and under the blocked-up load. The construction and arrangement of parts of the lift-truck provide for distributing the load substantially equally forward and rearward of the common axis of the forward wheels 20. With this equalization of the load, there is little or no weight added to the rear wheel 21 and thus the truck may be easily turned and maneuvered.

Because a slight inclination may cause the truck to roll, such as on a scaffolding platform, means may be provided for stopping or braking any such undesired movement. For this purpose, a simple braking device is added to the frame. The braking device consists of a rod 44 directed downwardly and guided in a tube 45. A spring 46 biases the rod 44 downwardly. Upon releasing the rod 44 from its catch, the rod protrudes downwardly to engage the platform or surface upon which the truck rides. To hold the rod from its braking position, the rod is raised and moved to hold it in a raised position.

To operate my device in its preferred form as illustrated, the truck is moved to a position adjacent a load as in Figure 2 with the lifting device in the lowered position shown in Figure 2. The truck is then moved forwardly so as to extend the fingers or fork 24 under the palletized load so that the load is substantially uniformly distributed upon the fingers or fork 24 and on opposite sides of the axis of the forward wheels 20. When the truck is in its loaded position, the load is squarely upon the fork 24 and back adjacent the backboard 23. When in this position, the jack is operated by pumping the handle 35 to raise the lifting device.

Figure 4:
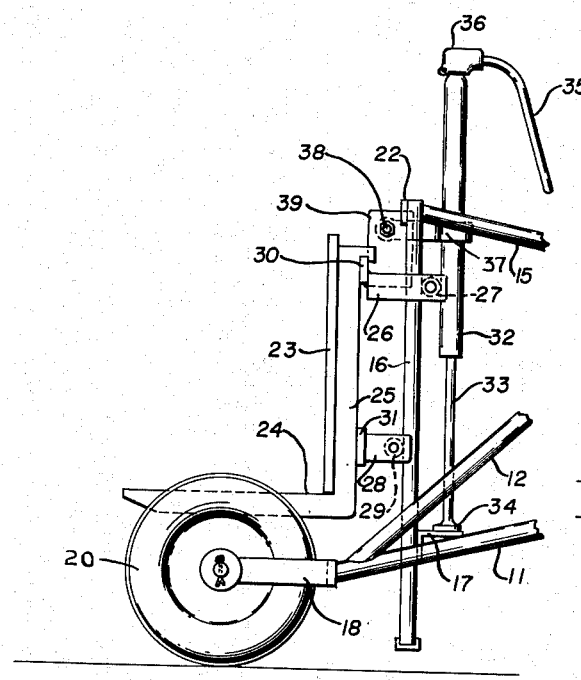
Figure 4 is a partial side view of my lift-truck with the lifting device shown in its raised position.

A desired uppermost position of the lifting device is illustrated in Figure 4. When in such a raised position, the load on the lifting device is free and clear of the platform or surface upon which the truck is moved. The truck may thereupon be freely pushed about and moved to a position where a load is desired, such as where a mason is working and desires a load of bricks to be located. When at that location where the load is to be deposited, the jack is to be operated to again lower the lifting device and thus to deposit the palletized load back upon the platform or other surface upon which the truck is being operated. When the weight of the load is upon the blocks 41 of the pallet, that is, when the weight of the load is off the fork 24, the truck is moved rearwardly where it is free and clear of the pallet. The truck is then ready for another trip for transporting another load. One man can easily operate and move the truck and the arrangement is such that a minimum of energy is expended in moving a given quantity of material. The operation of the truck is safe and its use is convenient and practical.

The disclosure herein set forth includes the disclosure in the appended claims, as well as that set forth in the foregoing description and in the drawings.

Although this invention has been described in its preferrred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A carrier comprising in combination a frame, said frame including a pair of spaced bottom members extending outwardly and forwardly from a rear portion to a pair of spaced forward portions, a cross-member extending across between said bottom members forwardly of said rear portion, a pair of spaced diagonal members extending from said forward portions of said bottom members upwardly and rearwardly, a handle member extending between and connecting said diagonal members adjacent the rearward ends thereof, a pair of bracing members extending between said bottom members and diagonal members respectively adjacent the rearward ends thereof, a pair of upper members extending forwardly from adjacent the rearward ends of said diagonal members, and a pair of substantially upright posts extending downwardly from adjacent the forward ends of said upper members, respectively, and carried by said bottom members, a pair of forked wheel-mounting members carried by and extending forwardly from the frame adjacent the respective spaced forward portions of the bottom members, a pair of spaced and parallel forwardly disposed wheels journaled on said wheel-mounting members, a swivel wheel-mounting member carried by the frame adjacent said rear portion of the bottom members, a rearwardly disposed wheel journaled on said swivel wheel-mounting member, and a lifter carried by said frame, said lifter including finger means and a back member, said back member being disposed and substantially upright and arranged forwardly of, and parallel to, said upright posts, said finger means extending substantially at right angles to said back member and forwardly from the said back member at a location rearwardly of the axes of said forwardly disposed wheels to a location forwardly of the axes of said forwardly disposed wheels, said finger means being disposed between said forwardly disposed wheels, guide means carried by said back member and engaging said upright posts, respectively, to guide up and down movement of said lifter relative to said frame, and mechanical-advantage means operatively connecting said frame and said lifter for raising said lifter, said lifter being arranged to lift on said finger means a load from between said forwardly disposed wheels for transportation of the load by the said frame on said wheels.

2. A carrier comprising in combination a frame, a pair of forwardly disposed and spaced wheels journaled on said frame, said wheels having a common axis disposed transversely of said carrier, said carrier being open from its forward end and between said wheels to present a U-shape in which the wheels are mounted at the forward ends of the arms of said U, a swivelly-mounted wheel mounted on said frame rearwardly of, and on a line intermediate of, said forwardly disposed wheels, a lifting device carried by said frame, said lifting device having an upright portion and a forwardly extending finger portion adapted to extend under and raise a load, said upright portion being positioned within the opening of said U-shape rearwardly of said common axis and adjacent the base of said U, said finger portion being disposed at substantially a right angle to said upright portion and extending forwardly of said common axis, said finger portion being disposed between said forwardly disposed wheels and extending forwardly and rearward from said common axis to carry a load thereon with a portion of the load weight on each side of said common axis, guide means engaging said upright portion and said frame for guiding upward and downward movement of said lifting device, and means carried by said frame for raising said lifting device and load positioned thereon whereby the load in raised position may be transported by the carrier.

3. In combination, a frame having forwardly extending and spaced-apart arms adapted to embrace a load to be transported, forward wheels having substantially a common axis journaled on said arms, a swivelly-mounted wheel mounted to said frame rearwardly of said forward wheels, a lifting device carried by said frame, said device having a platform portion positioned between said arms and intermediate of said forward wheels and disposed forwardly and rearwardly of said common axis, said platform portion being positionable at a level below said common axis and being adapted to extend under a load disposed between said arms, and mechanical-advantage means carried by said frame for raising said lifting device to suspend a load on said platform during movement of the frame on said wheels.

4. The combination of a wheel truck and a a lifting device, said truck having an open bay between its forward wheels to permit the truck to move forwardly on opposite sides of a load and to accommodate the load in said bay between said forward wheels, said lifting device being arranged in said bay and carried by said truck, said lifting device having a finger portion extending forwardly at a level lower than the tops of said forward wheels and between said forward wheels to project intermediate of said forward wheels under a load accommodated in said bay, said lifting device including means for raising said finger portion relative to said truck to hold a load on said finger portion in raised position during transit of the wheeled truck.

5. The combination of a frame having an open forked forward end defining a space between side portions of the truck accessible from the open end of the truck, said frame having a rearward portion joining said side portions, a pair of forward wheels each journaled on the forward end of a said side portion, respectively, of said frame, the axes of said forward wheels being disposed transversely of said frame, a rear wheel swivelly mounted to said rearward portion, said frame being movable on said wheels, a fork-lift device carried by said frame and positioned within said space, said device having a forked portion extending longitudinally of said frame intermediate and spaced from the vertical planes passing through said forward wheels, said forked portion being positionable in lowered and raised positions, said forked portions in lowered position having its top load-supporting surface located below the axes of said forward wheels, said forked portion being disposed both rearwardly and forwardly of the axes of said forward wheels, and raising means carried by said frame for raising said fork-lift device to hold in raised position a load on said forked portion during movement of said frame on said wheels and transportation of said load.

6. A wheeled truck comprising a frame having a forked open end to provide a bay embraced by sides and a rear of the frame, said frame sides having forward ends embracing said bay, a pair of forward wheels journaled, respectively, on said forward ends, a lifting device mounted on said frame and having a forwardly extending lifting portion disposed in said bay between said sides intermediate of said forward wheels, and means carried by said frame for raising and lowering said lifting device relative to said frame to positions below and above the axes of said forward wheels, said truck being wheelingly movable toward and about a load to accommodate the load between said sides and said lifting portion being simultaneously insertable under said load upon said movement of the frame toward and about said load, the raising of the lifting device raising said load to permit wheeled movement of the truck with said load carried by the truck between said sides.

7. A carrier comprising in combination a frame, said frame having two side portions and a rear portion joining said side portions to define a forwardly facing open bay, a pair of forward wheels for supporting said frame and journaled to said side portions adjacent the forward ends thereof and arranged on a common axis, a rearward wheel for supporting said frame and mounted to said rear portion, an upright member carried by said frame on the rearward side of said open bay and extending to levels above and below said common axis, a lifting device positioned in said open bay and guided in up and down motion in said bay by said upright member, said lifting device having a load-supporting portion, the load-supporting portion having a top surface extending forwardly and rearwardly of the common axis, the said top surface being adapted to protrude under and engage a load located over the load-supporting portion and between the side portions of the frame, the lifting device being positionable to locate the top surface of the load-supporting portion to a level below the said common axis and intermediate the forward wheels, and means carried by said frame for raising said lifting device relative to said frame while guided by said upright member to a raised position whereby the load raised on the lifting device may be transported by the carrier.

8. A carrier comprising in combination a frame, said frame having two spaced side portions and a rear portion arranged to form a forwardly facing open bay, said side portions adjacent the forward ends thereof being disposed in a substantially horizontal plane, a pair of forward wheels journaled to said side portions adjacent the forward ends, the axes of said forward wheels being disposed substantially in said horizontal plane and said forward wheels extending above and below said side portions in said horizontal plane, a lifting device carried by said frame in said open bay, said lifting device extending both forwardly and rearwardly of the axes of said forward wheels and being positionable in a first location below the axes of and intermediate the forward wheels to extend under a load and positionable in a second location above said first location to raise the load carried thereon, said lifting device being guided in movements between said locations by said frame along the frame on the rearward side of said open bay, and a jack carried by the frame for raising the lifting device to a raised position during the transport by the carrier of a load on the raised lifting device.

9. A carrier combining in combination a frame, said frame having two spaced side portions and a rear portion arranged to form a forwardly facing open bay, said side portions adjacent the forward ends thereof being disposed in a substantially horizontal plane, a pair of forward wheels journaled to said side portions adjacent the forward ends, the axes of said forward wheels being disposed substantially in said horizontal plane and said forward wheels extending above and below said side portions in said horizontal plane, an upright guide member carried by the frame and located at the rearward portion of the open bay, said upright guide member extending above and below the said horizontal plane, a lifting device carried by said frame and positioned in said open bay forwardly of said guide member, bearing members engaging said lifting device and said guide member, said lifting device being movable up and down in said open bay while guided by said guide member and bearing members, the lifting device having a load-supporting portion, said lifting device being positionable to a lower position to locate said load-supporting portion substantially below said horizontal plane to extend between said forward wheels under the lower surface of a load, one of said bearing members being positioned below said horizontal plane upon said load-supporting portion being located in said lower position, said lifting device being positionable to a raised position to locate said load-supporting portion above said horizontal plane, and raising means mounted on said frame and connected to said lifting device for raising said lifting device relative to said frame to said raised position to provide for holding a load on the load-supporting portion in raised position during travel of the carrier.

References Cited in the file of this patent

UNITED STATES PATENTS

| Number | Name | Date |
| --- | --- | --- |
| 2,156,204 | Stolze | Apr. 25, 1939 |
| 2,620,932 | Alpine | Dec. 9, 1952 |